Figures 1, 2:
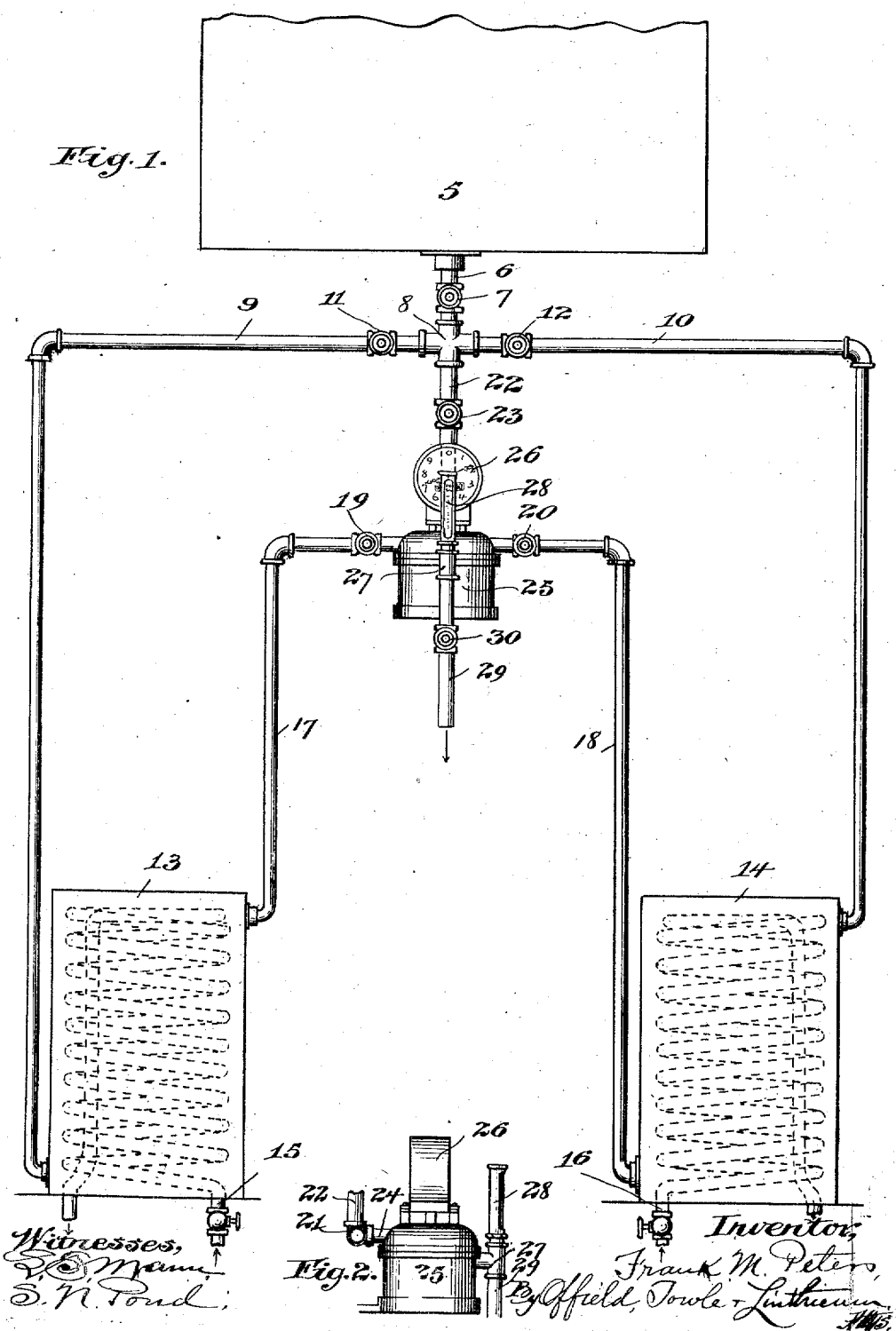

No. 821,187. PATENTED MAY 22, 1906.
F. M. PETERS.
WATER ATTEMPERATING AND MEASURING SYSTEM.
APPLICATION FILED DEC. 3, 1903.

Witnesses,
Inventor,
Frank M. Peters

UNITED STATES PATENT OFFICE.

FRANK M. PETERS, OF CHICAGO, ILLINOIS.

WATER ATTEMPERATING AND MEASURING SYSTEM.

No. 821,187.  Specification of Letters Patent.  Patented May 22, 1906.

Application filed December 3, 1903. Serial No. 183,649.

*To all whom it may concern:*

Be it known that I, FRANK M. PETERS, a citizen of the United States, residing at Chicago, in the county of Cook and State of Illinois, have invented certain new and useful Improvements in Water Attemperating and Measuring Systems, of which the following is a specification.

My invention relates to improvements in devices for controlling or fixing the temperature of water and for measuring the volume thereof between a source of water-supply and a point at which it is desirable to utilize fixed quantities of water at predetermined uniform temperatures. Devices of this general character are desirable for use in bakeries, breweries, and similar establishments, where measured quantities of water are required for the proper mixing of batches of dough or fermentation of malt. In such establishments it is desirable to effect the supply of water not only in the proper quantities, but also at various uniform temperatures, such as are adapted to secure the best results for fermentation or otherwise in the manufactured product. The mixing of hot and cold water to obtain a resultant liquid of the proper temperature has, in the case of bakery products, usually been done in a barrel or similar receptacle, the liquid being tested with a thermometer and then withdrawn in proper quantities for the purpose required, which operation consumes considerable time.

My invention is designed to effect an economy of time and labor required for such operation, and in accordance with my invention I employ, in connection with a source of water-supply, water heating and cooling devices with pipe connections from said source of water-supply thereto and a water-meter equipped with both volume and temperature indicating devices and pipe connections thereto from both of said heating and cooling devices with a pipe connection from the discharge side of the meter to the point of utilization. I also provide in connection with the foregoing a pipe leading directly from said source of water-supply to said water-meter, with valves in all of said pipe connections, whereby exactly the required amounts of artificially heated and cooled water may be mingled with water at the original temperature to produce a resultant mixture of exactly the required temperature, or where the water at the natural temperature as it it comes from the original source of supply happens to be at the desired temperature it may be passed directly through the meter and used in the required quantity.

A system embodying my present invention in an approved form is illustrated in the accompanying drawings, in which—

Figure 1 is a front elevational view diagrammatic as to the relative locations of the several parts and their pipe connections, and Fig. 2 is a side elevational view of the combined water meter and mixer and temperature-indicating device.

Referring to the drawings, 5 may designate a reservoir or equivalent source of water-supply wherein the water exists at what I may call "normal" temperature, which will of course be substantially the atmospheric temperature surrounding it.

6 is a pipe connection tapping the bottom of the reservoir 5 and having a cut-off cock 7. The pipe 6 leads into a four-way coupling 8, from the lateral branches of which latter pipes 9 and 10, equipped with cut-off cocks 11 and 12, respectively, lead off to heating and cooling chambers 13 and 14, respectively, which latter may conveniently be provided with heating and cooling agents in the form of steam and refrigerating coils 15 and 16, respectively. From the chambers 13 and 14 pipe connections 17 and 18, equipped with cut-off cocks 19 and 20, respectively, lead off to opposite lateral branches of a four-way coupling 21, Fig. 2, the vertical member of this coupling having a pipe connection 22 leading into the depending branch of the coupling 8 and provided with a cut-off cock 23. The intermediate horizontal member of the coupling 21 has a short pipe connection 24, Fig. 2, leading into the chamber of a combined water commingling and measuring device 25, which has surmounted thereon a volume-indicating dial 26. The opposite side of the chamber 25 is tapped by a T-coupling 27, seated in the upper member of which is a thermometer 28, while from its lower member a pipe connection 29, having a cut-off cock 30, leads directly to the point of utilization.

The manner of operating the system is as follows: Assuming that there is a water-supply in the reservoir 5, which is colder than the temperature at which the water is required to be utilized, the cocks 7 and 11 are fully opened and the cocks 23 and 19 are opened to such relative extents as to admit to the commingling-chamber of the meter 25 such proportionate amounts of cold and heated water as produces a resultant fluid of the desired temperature, as indicated by the thermometer 28, this resultant fluid passing off through the pipe 29, the cut-off cock 30 of which is opened to the point of utilization. If the water in the reservoir 5 is warmer than is required, the cut-off cocks 7 and 12 are fully opened, and the cocks 23 and 20 are manipulated in the manner last described to produce, by the aid of the cooling device 14 16, a resultant fluid of the required temperature. If the water in the reservoir 5 happens to be at just the required temperature, both the heating device and the cooling device are cut out by closing the valves 11, 12, 19, and 20, and by then opening the valves 7 and 23 the water is admitted directly to and passed through the measuring and temperature-indicating device to the point of utilization. It is also evident that when both the heating and cooling devices are operative the water might be directed through both of the latter to the commingling device to effect the desired attemperating thereof; but such a course would be uneconomical as compared with the methods previously described.

It will of course be understood that when the water is first turned on it will be allowed to run off during the period in which the valves 23 and 19 or 23 and 20 are being adjusted to obtain the correct relative proportions of normal and heated water or normal and cooled water to secure the predetermined temperature of the resultant mixture, the reading of the meter-dial being noted at the point when the utilization of the attemperated water begins and the flow of the attemperated water being allowed to continue until the dial indicates the passage of the predetermined volume required for any particular batch of dough or other use. Of course, either of the cut-off valves 11 and 19 and 12 and 20 might be dispensed with; but I prefer to employ each pair of valves in connection with the heater and cooler, respectively, to control the water-flow on both sides of the latter.

A prominent advantage of the system as above described results from the fact that the water flowing into the commingling-chamber through the several connections thereto is all under the same head, this greatly facilitating the rapid and uniform commingling of the component parts of the resultant fluid and lessening the liability of hot and cold streaks in the latter.

I claim—

1. The combination with a source of water-supply, of a water measuring and commingling device, two valve-controlled pipe connections between said source and said measuring and commingling device, a water-heater and water-cooler interposed in said pipe connections, respectively, a valve-controlled pipe connection leading directly from said source to said measuring and commingling device, a pipe leading from the discharge side of the latter, and a thermometer applied to said last-named pipe, substantially as described.

2. The combination with a source of water-supply and a water measuring and commingling device, of a four-way coupling, a valve-controlled pipe leading from said source to one branch of said coupling, two valve-controlled pipe connections leading respectively from two other branches of said coupling to said measuring and commingling device, a water-heater and water-cooler interposed in said last-named connections, respectively, and a valve-controlled connection leading from the remaining branch of said four-way coupling directly to said measuring and commingling device, and a pipe leading from the discharge side of the latter, substantially as described.

3. A water attemperating and measuring system for use in bakeries, breweries, and similar establishments, comprising a source of water-supply, a water measuring and commingling device, a direct pipe connection from the former to the latter having two cut-off valves therein, two other pipes tapping said direct pipe connection between the cut-off valves thereof and leading into said water measuring and commingling device, a water-heating device interposed in one of said last-named pipes and a water-cooling device interposed in the other, cut-off valves in said last-named pipes, and a discharge-pipe from said water measuring and commingling device leading to the point of utilization, substantially as described.

FRANK M. PETERS.

Witnesses:
SAMUEL N. POND,
FREDERICK C. GOODWIN.